US009744853B2

(12) United States Patent
Mere et al.

(10) Patent No.: US 9,744,853 B2
(45) Date of Patent: Aug. 29, 2017

(54) SYSTEM AND METHOD OF TRACKING WITH ASSOCIATED SENSORY FEEDBACK

(71) Applicants: Shadi Mere, Ann Arbor, MI (US); Theodore Charles Wingrove, Plymouth, MI (US); Paul O. Morris, Ann Arbor, MI (US); Kyle Entsminger, Canton, MI (US)

(72) Inventors: Shadi Mere, Ann Arbor, MI (US); Theodore Charles Wingrove, Plymouth, MI (US); Paul O. Morris, Ann Arbor, MI (US); Kyle Entsminger, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/955,834

(22) Filed: Dec. 1, 2015

(65) Prior Publication Data
US 2016/0185220 A1   Jun. 30, 2016

Related U.S. Application Data

(60) Provisional application No. 62/098,126, filed on Dec. 30, 2014.

(51) Int. Cl.
| | |
|---|---|
| *B60Q 1/00* | (2006.01) |
| *B60K 35/00* | (2006.01) |
| *B60K 37/06* | (2006.01) |
| *G06F 3/01* | (2006.01) |
| *G06F 3/0485* | (2013.01) |
| *B60C 9/00* | (2006.01) |
| *B60Q 3/80* | (2017.01) |

(52) U.S. Cl.
CPC .............. *B60K 35/00* (2013.01); *B60K 37/06* (2013.01); *G06F 3/013* (2013.01); *G06F 3/016* (2013.01); *G06F 3/017* (2013.01); *G06F 3/0485* (2013.01); *B60C 9/00* (2013.01); *B60K 2350/106* (2013.01); *B60K 2350/1008* (2013.01); *B60K 2350/1052* (2013.01); *B60Q 3/80* (2017.02)

(58) Field of Classification Search
CPC ............ B60K 35/00; B60K 2350/1052; B60K 2350/106; B60K 2350/1008; B60Q 3/00; B60Q 5/00; B60Q 9/00; G06F 3/011
USPC .............. 340/438, 4.12, 5.83; 348/46, 62, 77
See application file for complete search history.

(56) References Cited

U.S. PATENT DOCUMENTS

| | | | |
|---|---|---|---|
| 6,397,137 B1 | 5/2002 | Alpert et al. | |
| 8,120,577 B2 | 2/2012 | Bouvin et al. | |
| 2006/0271261 A1* | 11/2006 | Flores | B60Q 3/0233 701/49 |
| 2012/0169582 A1* | 7/2012 | Tschirhart | G02B 27/01 345/156 |
| 2014/0129987 A1 | 5/2014 | Feit et al. | |

(Continued)

*Primary Examiner* — Dhaval Patel
(74) *Attorney, Agent, or Firm* — Dickinson Wright PLLC

(57) ABSTRACT

The aspects of the present disclosure provide a tracking system with associated sensory feedback and method for activating a component and adjusting the component's mode of operation within a vehicle with a tracking system. Sensory feedback may be provided based on the user's gaze or input detected by the tracking system—and/or in response to the change in the component's mode of operation. The system and method may further include the ability to control and adjust the component through gesture-based control.

5 Claims, 5 Drawing Sheets

(56) References Cited

U.S. PATENT DOCUMENTS

| | | | |
|---|---|---|---|
| 2014/0256438 A1 | 9/2014 | Grant et al. | |
| 2014/0292665 A1 | 10/2014 | Lathrop et al. | |
| 2015/0049012 A1* | 2/2015 | Liu | G02B 27/017 345/156 |
| 2015/0185834 A1* | 7/2015 | Wingrove | B60K 37/06 345/156 |
| 2016/0084952 A1* | 3/2016 | Karlapalem | G01S 13/08 342/118 |

* cited by examiner

SYSTEM AND METHOD OF TRACKING WITH ASSOCIATED SENSORY FEEDBACK

CROSS-REFERENCE TO RELATED APPLICATION

This patent application claims priority to U.S. Provisional Application No. 62/098,126, filed Dec. 30, 2014, entitled "SYSTEM AND METHOD OF TRACKING WITH ASSOCIATED SENSORY FEEDBACK". This patent application contains the entirety of U.S. Provisional Patent application No. 62/098,126.

BACKGROUND

Different components within a vehicle are controlled and adjusted by a specific function, switch, button, touch screen, gesture controlled system, or head tracking system. For instance, some inputs and systems require the user to scroll through multiple graphic interfaces to select a specific component and adjust that component. Some vehicles have inputs and systems that do not provide associated interactive feedback in response to selecting the component for adjustment and after adjusting the component. Other inputs and systems may provide the user feedback on a screen or in an area separate from the location where the component is adjusted. Alternatively, inputs and systems may provide the user feedback after a substantial period of time has elapsed such that the user is unable to tell if the component has effectively been adjusted or is unable to tell if they made a mistake while adjusting the component. In other words, the inputs and systems of components are disassociated or partitioned from any feedback such that each inputs/systems and feedback does not operate seamlessly together.

Thus, a system and method that provides for easy adjustment of components and/or mode of operations and provides associated feedback with the adjusted component to alert the user of the selection, change in the mode of operation, or a mistake is desirable.

SUMMARY

A system for providing sensory feedback with a tracking device installed in a vehicle is provided herein. The system includes a tracking module configured to track a user motion, the user motion being independent of the user making physical contact with an input employed to control the component of the vehicle; and a sensory feedback module configured to provide sensory feedback in response to the tracking module tracking the user's engagement with a component of the vehicle.

In another example, the tracking module further comprises an eye-gaze tracker, and in response to the eye-gaze tracker detecting the user's eyes oriented towards the component, instigating the sensory feedback module to provide sensory feedback.

In another example, the sensory feedback is defined as a haptic response.

In another example, the sensory feedback is defined as a sound response.

In another example, the sensory feedback is defined as a visual response.

In another example, the visual response is a lighted element around the component.

In another example, the vehicle includes multiple components additionally provided to the component, and in response to tracking module detecting a change of attention from a first component to a second component, the sensory feedback module being further configured to provide sensory feedback.

A component interface is also described herein. The component interface is in a vehicle, coupled to an electronic control unit (ECU) with a tracking device. The component interface includes an electronic control portion electrically coupled to the ECU, with the ECU configured to directed control of the component from an interface device; and a sensory feedback device configured to provide sensory feedback in response to the tracking device detecting a user engagement with the component, the user engagement being independent a physical contact of the component.

In another example, the component interface is installed in a dashboard of the vehicle.

In another example, the component interface is one of a communication system, global positioning satellite device, entertainment display, and a high voltage air conditioning unit.

In another example, the interface device is an electronic display.

In another example, the sensory feedback is defined as a haptic response.

In another example, the sensory feedback is defined as a sound response.

In another example, a lighted panel is provided on a surface in which the component interface is visible to a user, and the sensory feedback is defined as a visual response provided on the lighted panel.

An electronic display device provided in a vehicle is also described herein. The electronic display includes an interface device configured to control a component in the vehicle; a coupling logic circuit configured to electrically couple the electronic display to a tracking device and the component, and in response to the tracking device signifying a user is engaging with the component in a non-physical manner, the interface device is instructed to electrically engage solely with the component.

DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF THE DRAWINGS

Figure 1:
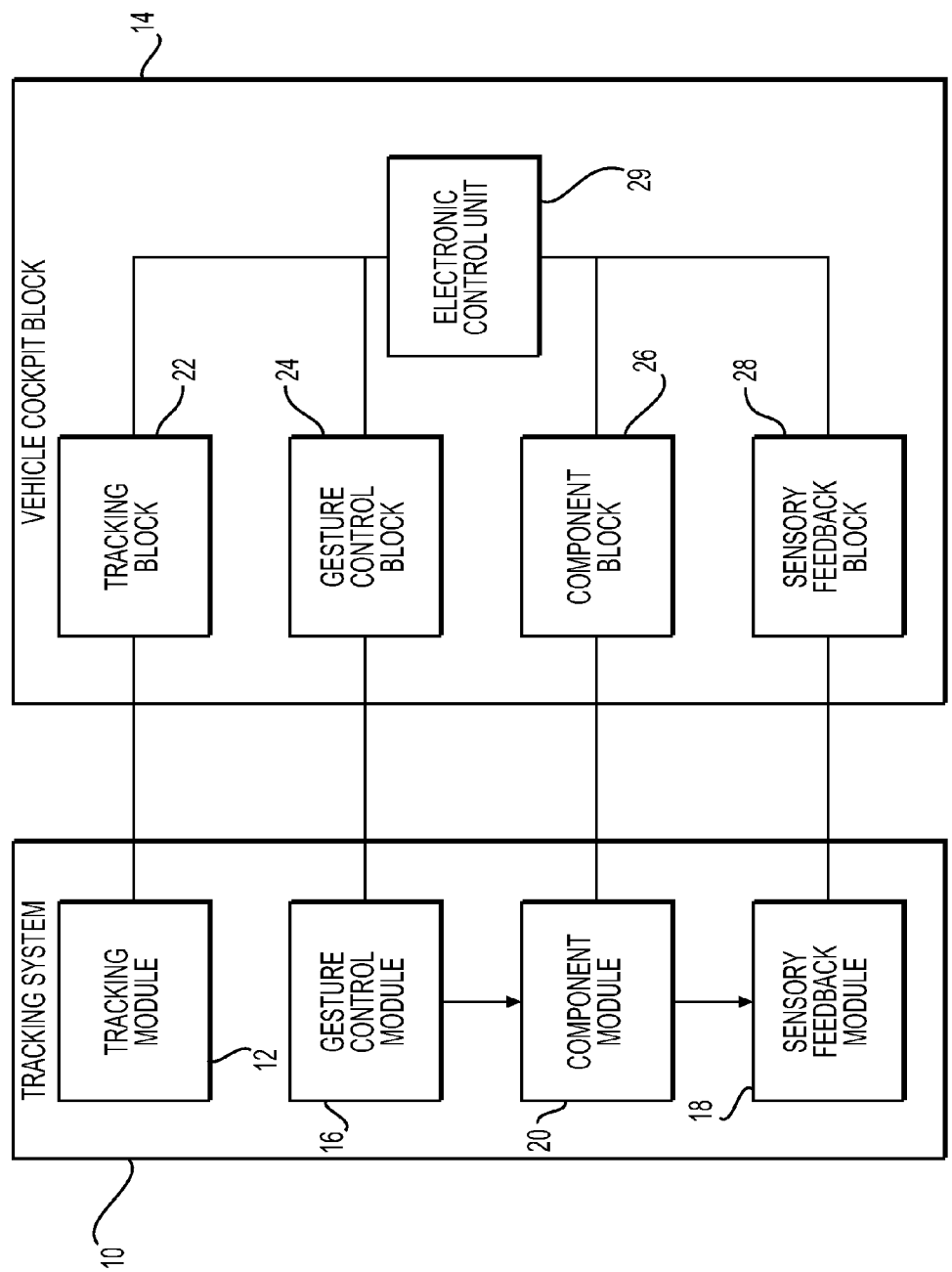
FIG. 1 is a block diagram of tracking system with associated sensory feedback for activating a component and adjusting the component's mode of operation in accordance with the present disclosure.

Detailed examples of the present disclosure are provided herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure. As those of ordinary skill in the art will understand, various components of the present disclosure as illustrated and described with reference to any of the Figures may be combined with components illustrated in one or more other Figures to produce examples of the present disclosure that are not explicitly illustrated or described. The combinations of components illustrated provide representative examples for typical applications. However, various combinations and modifications of the components consistent with the teachings of the present disclosure may be desired for particular applications or implementations.

DETAILED DESCRIPTION OF THE DRAWINGS

Detailed examples of the present disclosure are provided herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure. As those of ordinary skill in the art will understand, various components of the present disclosure as illustrated and described with reference to any of the Figures may be combined with components illustrated in one or more other Figures to produce examples of the present disclosure that are not explicitly illustrated or described. The combinations of components illustrated provide representative examples for typical applications. However, various combinations and modifications of the components consistent with the teachings of the present disclosure may be desired for particular applications or implementations.

The aspects of the present disclosure provide for a tracking system with associated sensory feedback and a method for activating a component and adjust or changing the component's mode of operation through a tracking system with associated sensory feedback. The tracking system may include a tracking module, a sensory feedback module, a gesture control module, and a component module. The tracking system may be configured to track the user's eye position in a three-dimensional space and select or activate a component the user is focused on. The user may then control and alter or adjust the component's mode of operation through gesture detection with the gesture control module. The tracking system may also be configured to provide the user with sensory feedback in response to the selected or activated component. The tracking system may further provide the user with sensory feedback in response to a change to the component's mode of operation, or in response to is an attempted or unsuccessful change to the component's mode of operation.

The tracking system has various advantages. First, the tracking system allows for the association of three-dimensional gaze tracking detection with gesture-based control in the same system. The tracking system also allows the user an easy way to change or alter the component's mode of operation. The tracking system further provides the user feedback in response to a user's eye direction, change in the component's mode of operation, or an unsuccessful attempt to change the component's mode of operation.

FIG. 1 a block diagram of a tracking system 10 with associated sensory feedback for activating a component and adjusting the component's mode of operation in accordance with the present disclosure. The tracking system 10 may be configured to detect a component focused on by a user, to activate the component in response to the user's gaze, and to provide the user sensory feedback associated with the activated component. The sensory feedback may be visual, audio, or haptic. The sensor feedback may also be a response, relevant to the component's condition. The tracking system 10 may also be configured to employ gesture-based controls to change or adjust the component's mode of operation, and may provide sensory feedback associated with the change in the mode of operation.

The tracking system 10 may include a tracking module 12 configured to detect the user's gaze and also configured to associate one or more zones with one or more components to assist in detecting the user's gaze. The user's gaze may be determined by the user's eye position, line of sight, head position, or a combination thereof in a three-dimensional space. In other words, the user's gaze may be detected to an XYZ plane to select or activate the component. For example, if the user focuses on an HVAC vent located in a first zone, the tracking module 12 may consider the user's eye position, line of sight, or head position with respect to the XYZ plane or zone to determine the user gaze on the HVAC unit. The tracking module 12 may include a tracking device such as one or more cameras and sensors for detecting the user's gaze. For example, the camera may be any camera configured to detect a user's eye, line of sight, or head position. In the alternative, the sensor may be an infrared sensor or any position sensor configured to detect the use's eye, line of sight, or head position.

In another aspect, the tracking module 12 may include a combination of one or more cameras and sensors to detect the user's gaze. The tracking device 12 may be disposed within the steering wheel of the vehicle, within the panel adjacent to the steering wheel, or above the steering wheel. The tracking device 12 may further be configured to be automatically adjustably or may rotate in response to detecting the gaze of the user within any area of the vehicle's cockpit. The tracking module 12 may interface with a vehicle tracking block, which in turn may be in communication with the vehicle's electronic control unit. In the alternative, the tracking module 12 may include a transmitter, configured to transmit data representing the user's eye or head position to the vehicle block, which may receive and process the data, and may activate the component selected by the user's gaze to control and adjust the component's mode of operation.

The tracking system 10 may also include a gesture control module 16, a sensory feedback module 18, and a component module 20. Each may be in communication with the other and may also be in communication with the tracking module 12. Each may further interface with corresponding vehicle block such as, a gesture control block, a sensory feedback block, and a component block or may interface with directly with the electronic control unit through one or more transmitters and receivers.

The gesture control module 16 may be configured to detect a user's performed gesture to control and/or adjust a mode of operation of the component. The gesture control module 16 may include a gesture detection device such as, one or more cameras, sensors, or a combination there of. Gestures may be preprogrammed or set by a manufacturer or user. Further, specific gestures may be associated with certain features. For example, the user may turn their hand like they are turning a rotary knob to adjust the temperature within the vehicle. The gesture control module 16 may employ and store a look-up table to associate gestures with specific modes of operation for one or more components.

Figure 4:
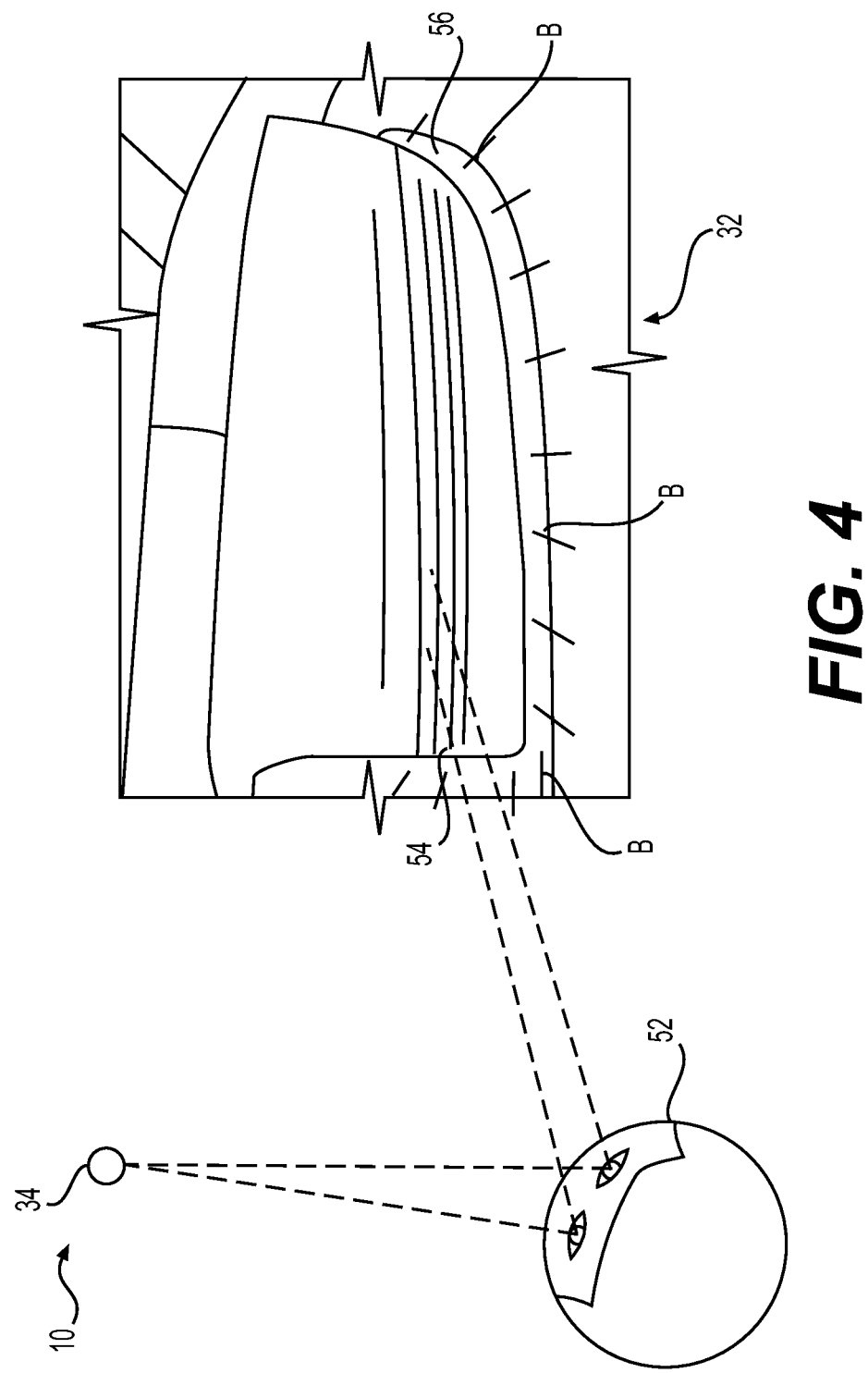
FIG. 4 is an illustration of an example of a component selected through a tracking system with associated sensory feedback in accordance with an aspect the present disclosure.

The sensory feedback module 18 may be configured to provide sensory feedback to the user in response to the component selected or activated by the user's gaze. The sensory feedback module 18 may also provide sensory feedback to the user in response to a change in the component's mode of operation or in response to an unsuccessful change in the component's mode of operation. An unsuccessful change may be a gesture that the gesture control module 16 does not recognize, a gesture that the user did not perform correctly, or a user mistake/error. Sensory feedback may include, but is not limited to, a color intensity change in ambient light, haptic feedback, a voice response, a sound, a chime, music, or other visual feedback such as, a change in display texts or graphics. For example, as shown in FIG. 4, the area surround the HVAC unit may illuminate in response to the user's gaze detected at the HVAC unit. The sensory feedback module may also associate certain components with types of sensory feedback through a look-up table.

The component module 20 may include one or more components that may be selected and activated by the tracking module 12, and may be controlled by the gesture control module 16. The components may include, but are not limited to, an HVAC display and unit, an entertainment display, a global position system (GPS) display, a window control system, a mirror control system, and a windshield wiper system. The components may further be associated with one or more zones to assist gaze detection.

In operation, the tracking system 10 may interface with the vehicle cockpit's electronic control unit to control and adjust the components. The tracking device may employ three-dimensional gaze detection to determine the user's eye position, line of sight, or head position with a zone. In particular, the tracking device may detect the user's gaze towards a three-dimensional zone associated with the component. The tracking device transmits a signal indicative of the user's gaze to the vehicle's electronic control unit to activate the component through the component module. Sensory feedback may be provided to the user in response to the activation of the component. The sensory feedback may be feedback that is commonly associated with the component. For example, when the user gaze is detected at a display in a second zone, the display may become brighter. The user may then perform a gesture to adjust or change the component's operating condition. A specific gesture may be associated with the component. For instance, if the user desires to adjust the volume on the radio, the user may motion their hand up or down to turn up or lower the radio volume. Sensory feedback may also be provided to alert the user that there has been a change in the mode of operation of the component.

Figure 2:
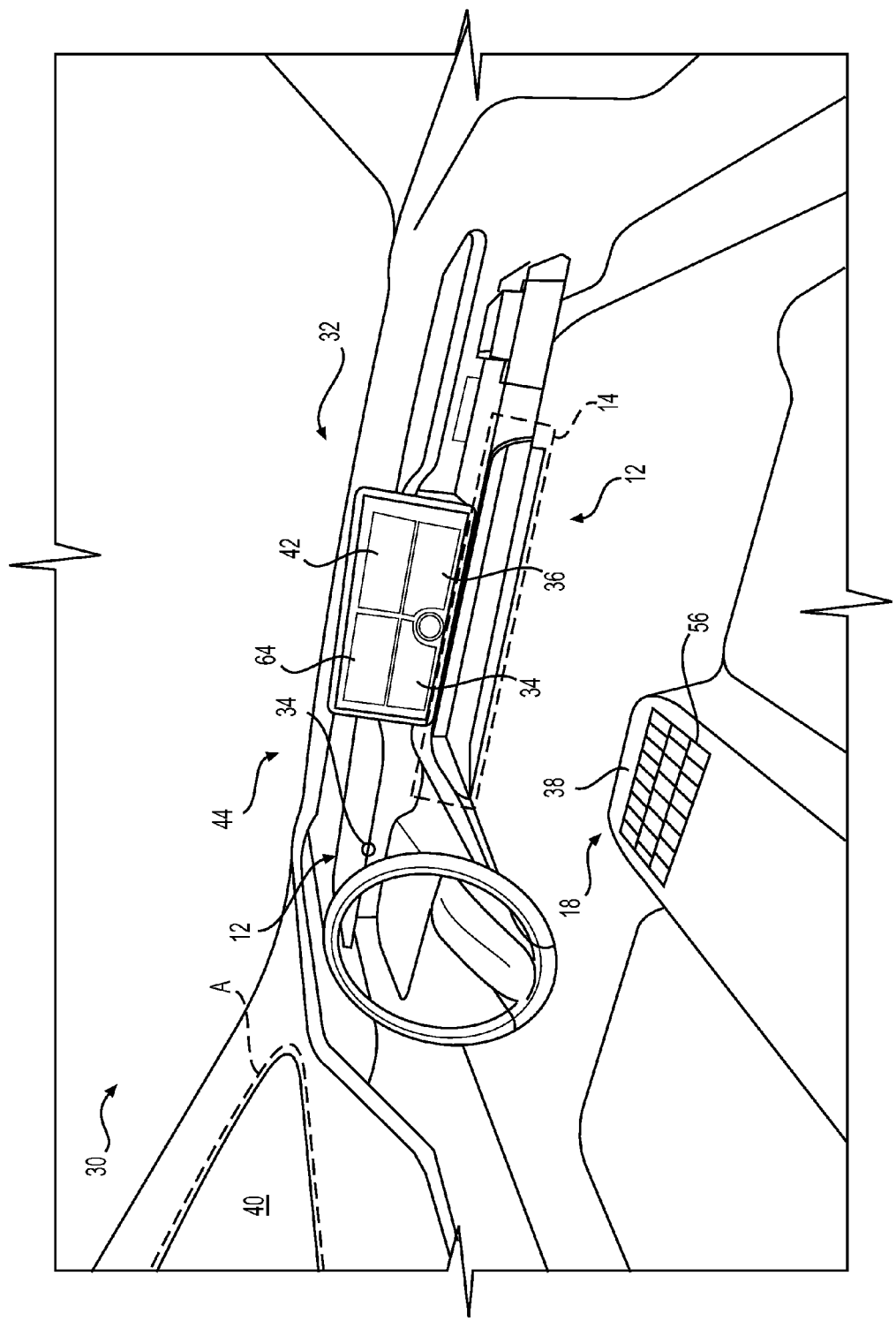
FIG. 2 is an illustration of a vehicle cockpit with a tracking system with associated sensory feedback for activating a component and adjusting a component's mode of operation in accordance with the present disclosure.

FIG. 2 is an illustration of a vehicle cockpit 30 with a tracking system 10 with associated sensory feedback for activating a component and adjusting a component's mode of operation in accordance with the present disclosure. The vehicle cockpit 30 may have one or more components 32 activated with the user's gaze and may be controlled and adjusted with a user's gesture. The component module 20 may include one or more components such as, but is not limited to, a HVAC display and unit 38 for providing heat and air conditioning, an entertainment display 36 for providing media content to the user, a GPS display for providing location related services of the vehicle to the user, a window control system 40 for controlling the windows of the vehicle, a mirror control system for controlling one or more mirrors associated with the vehicle, a weather system 42 and a windshield wiper system 44 for operating the windshield wipers. The components 32 may also be associated with a zone of the vehicle cockpit 30. For example, a first component such as the HVAC unit 38, may be associated with a first zone, and a second component such as the window control unit, may be associated with a second zone. The zones are denoted by dashed lines "A". The zone may assist in detecting the user's gaze and may be a three-dimensional space. Specifically, the user's gaze may be detected to an XYZ plane to select or activate the component.

FIG. 2 also shows a tracking module 12 with a tracking device 34, for detecting the user's gaze to activate the component 32 within the associated zone "A". The tracking device 34 may be disposed in an area adjacent to the steering wheel for tracking the user's gaze. The tracking device 34 may include one or more cameras, sensors, or a combination thereof. When the component 32 is activated, sensory feedback may be provided to the user to alert the user of the activated component 32 and to alert the user that they may adjust the activated component 32.

The system 10 may further include a gesture control module 18. The gesture control module 18 may include a gesture detection device 46 such as one or more cameras, sensors, or a combination thereof. The gesture control module 18 may also include an input device 48 to allow for the physical adjustment of components. The input devices 48 may include one or more switches, toggles, buttons, a keyboard, or a touch screen. The input device 50 may be located within the center console 50 of the vehicle cockpit 30. The input device 48 may also be located in other areas of the vehicle cockpit 30. For instance, the input device 48 may be located on the steering wheel. The gesture detection device 46 may also be located within the center console 50, and may also be adjacent to the input device 48. Further, the gesture control module 18 may be configured to detect a gesture performed by the user via the gesture detection device 46. A gesture may be employed to adjust or change the mode of operation of the selected component 32. The gesture may be preprogrammed by the manufacturer or may be preselected by the user.

Sensory feedback may be provided in response to a change in the mode of operation or to indicate a mistake made by the user. For example, if the user makes a gesture associated with a change in HVAC temperature, then the intensity of a red light surround the HVAC display 38 may increase as the temperature increases or the intensity of a blue light surrounding the HVAC display 38 may increase as the temperature decreases. In another example, the user may receive a voice response in response to a gesture that the gesture control module 18 does not recognize. The voice responses may be a response, relevant to the component's condition or mode of operation. For instance, the voice response may say "brrrr" after the user enters the vehicle and to alert the user that the vehicle is cold and that they should adjust of temperature of the vehicle.

Figure 3:
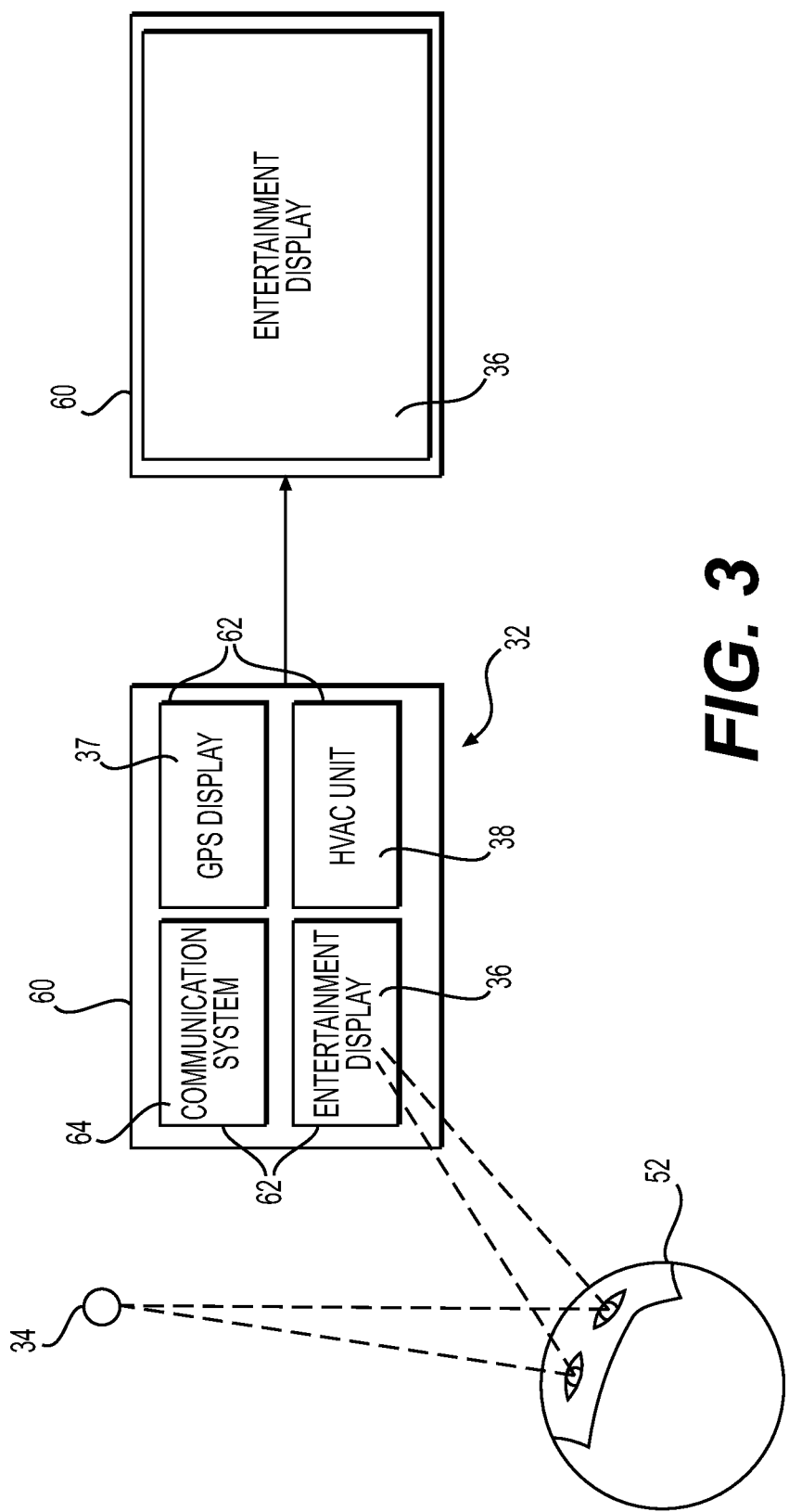
FIG. 3 is an illustration of an example of a component selected through a tracking system in accordance with an aspect of the present disclosure.

FIG. 3 is an illustration of an example of a component 32 selected through a tracking system 10 in accordance with an aspect of the present disclosure. The component 32 may include a graphical display 60. The graphical display 60 may be partitioned to include a plurality of component displays 62 such as an entertainment display 36, a GPS display 37, HVAC unit 38, and a communication system 64. When the tracking device detects the user 52 to be focused on one of the component displays 62 such as the entertainment display 36, the graphical display 60 may display a control interface for controlling the specific component or may display an expanded view of the selected component display 62 (i.e. the entertainment display 36). The user 52 may then control and adjust a mode of operation of the selected component display 62 by gesture(s) (not shown), or through an input device (not shown).

With respect to FIG. 4, an illustration of an example of a component 32 selected through a tracking system 10 with associated sensory feedback in is shown in accordance with an aspect of the present disclosure. In particular, FIG. 4 shows the tracking device 34 detecting a user's 52 gaze on a HVAC display and unit 38 and in particular, a HVAC vent 54. In response to the user's gaze, the area 56 surrounding the HVAC vent 54 illuminates, as denoted by "B"

Figure 5:
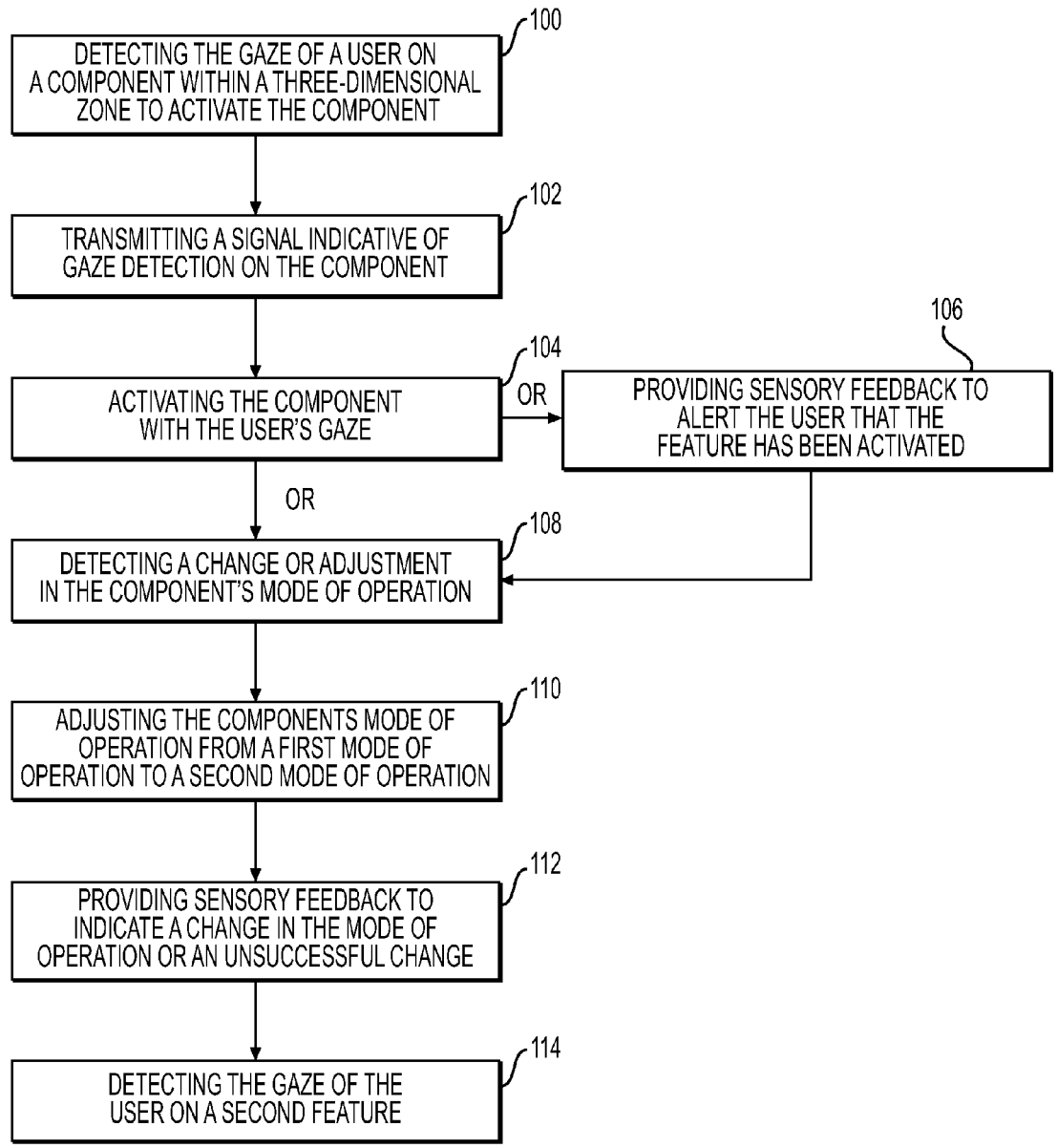
FIG. 5 is a flowchart of a method of activating a component and adjusting a component's mode of operation through the tracking system with associated sensory feedback in accordance with the present disclosure

FIG. 5 is a flowchart of a method for activating a component and adjusting a component's mode of operation through the tracking system with associated sensory feedback in accordance with the present disclosure. The tracking system may include a tracking module, a gesture control module, a sensory feedback module, and a component module as described in FIG. 1. The tracking module may detect the gaze of a user on a component within a three-dimensional zone to activate the component via a tracking device 100. The method may also include transmitting a signal indicative of gaze detection on the component from the tracking module to a vehicle block 102 and may be activated by the user's gaze 104. Sensory feedback may be provided to alert the user that the component has been activated through the sensory feedback module 106. Once the component is activated 104, a gesture indicative of a change or adjustment in the mode of operation of the component may be detected 108. The component may then be adjusted to change the mode of operation from a first mode of operation to a second mode of operation 110. Sensory feedback may be provided to indicate the change in the mode of operation or an unsuccessful change 112. The tracking device may then detect the gaze of the user on a second component 114 and so on. Alternatively, sensory feedback may be provided to the user prior to activating the component to alert the user of a component that should be adjusted.

Certain of the devices shown include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 6 and 7. The disclosed devices, components, and systems contemplate using or implementing any suitable technique for performing the steps illustrated in these figures. Thus, FIGS. 6 and 7 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

We claim:

1. A system for providing sensory feedback with a tracking device installed in a vehicle, comprising:
    a tracking module configured to track a user motion, the user motion being independent of the user making physical contact with an input employed to control the component of the vehicle; and
    a sensory feedback module configured to provide sensory feedback in response to the tracking module tracking the user's engagement with a component of the vehicle, and
    wherein the tracking module further comprises an eye-gaze tracker or a head tracker, and in response to the eye-gaze tracker detecting the user's eyes oriented towards the component or the head tracker detecting a movement in the user's head, instigating the sensory feedback module to provide sensory feedback, and
    one of the eye-gaze tracker and the head tracker is oriented at a non-visual based electronic display or interface employed to control the component of the vehicle,
    wherein the vehicle includes multiple components additionally provided to the component, and in response to tracking module detecting a change of attention from a first component to a second component, the sensory feedback module being further configured to provide sensory feedback.

2. The system according to claim 1, wherein the sensory feedback is defined as a haptic response.

3. The system according to claim 1, wherein the sensory feedback is defined as a sound response.

4. The system according to claim 1, wherein the sensory feedback is defined as a visual response.

5. The system according to claim 4, wherein the visual response is a lighted element around the component.

* * * * *